United States Patent [19]

Upadhye et al.

[11] Patent Number: 5,227,239
[45] Date of Patent: Jul. 13, 1993

[54] PRODUCTION OF HOLLOW AEROGEL MICROSPHERES

[75] Inventors: Ravindra S. Upadhye, Pleasanton, Calif.; Sten A. Henning, Dalby, Sweden

[73] Assignee: The United States of America as represented by the United States Department of Energy, Washington, D.C.

[21] Appl. No.: 620,123

[22] Filed: Nov. 30, 1990

[51] Int. Cl.⁵ .................................. B32B 5/16
[52] U.S. Cl. ..................... 428/402; 65/21.3; 65/21.4; 423/335; 423/338; 428/304.4; 502/8; 502/233
[58] Field of Search ............... 428/402, 304.4; 423/335, 338; 502/8, 10, 405, 407, 233, 423, 430, 433–436; 65/21.4, 21.3

[56] References Cited

U.S. PATENT DOCUMENTS

| | | | |
|---|---|---|---|
| 4,349,456 | 9/1982 | Sowman | 252/317 |
| 4,402,927 | 9/1983 | von Dardel et al. | 423/335 |
| 4,629,652 | 12/1986 | Carlson et al. | 428/304.4 |
| 4,713,233 | 12/1987 | Marsh et al. | 423/608 |
| 4,717,708 | 1/1988 | Cheng et al. | 502/233 |
| 4,777,154 | 10/1988 | Torobin | 501/84 |
| 4,873,218 | 10/1989 | Pekala | 502/418 |

Primary Examiner—Paul J. Thibodeau
Assistant Examiner—Hoa T. Lê
Attorney, Agent, or Firm—Henry P. Sartorio; Roger S. Gaither; William R. Moser

[57] ABSTRACT

A method is described for making hollow aerogel microspheres of 800–1200 μ diameter and 100–300 μ wall thickness by forming hollow alcogel microspheres during the sol/gel process in a catalytic atmosphere and capturing them on a foam surface containing catalyst. Supercritical drying of the formed hollow alcogel microspheres yields hollow aerogel microspheres which are suitable for ICF targets.

16 Claims, 3 Drawing Sheets

PRODUCTION OF HOLLOW AEROGEL MICROSPHERES

The United States Government has rights in this invention pursuant to Contract No. W-7405-ENG-48 between the U.S. Department of Energy and the University of California, for the operation of Lawrence Livermore National Laboratory.

FIELD OF THE INVENTION

This invention relates to hollow aerogel spheres, and to a process and apparatus for making them. More particularly, it relates to hollow silica aerogel microspheres which are characterised by uniform density, porosity, refractive index and strength. These spheres are suitable for use in a variety of applications including controlled nuclear fusion, very high surface area supported catalysts, and insulators.

BACKGROUND OF THE INVENTION

Sustained nuclear fusion in a controlled environment would yield an apparently inexhaustible supply of energy. Inertial confinement fusion (ICF) requires targets which can maintain the deuterium and tritium (DT) fuel as a uniform liquid layer, which may typically be up to several hundred microns in thickness. The high gain, single shell, direct drive ICF targets currently under consideration require, under certain conditions, that the fuel be levitated. Maintaining the thick liquid DT layer is quite difficult as the liquid fuel slumps under the influence of gravitational forces.

A suggested approach for maintenance of the thick liquid DT layer is the use of a small pore size, open cell, rigid foam structure which serves as a sponge to define the layer contours and to stabilize the liquid fuel against gravitational slumping. Darling, D. H., U.S. Pat. No. 4,693,938. Both inorganic (e.g. silica, alumina, borosilicate) and organic (e.g. polystyrene) materials have been suggested as appropriate compositions for the foam matrix of ICF targets.

When the target capsule, containing the deuterium-tritium (DT) fuel mixture, is irradiated by laser beams at a sufficiently high energy level, the outer layers of the ablator blow off, which drives the hollow capsule inward, causing an implosion which heats the fuel. At appropriate conditions, the fusion of the deuterium and tritium fuels is initiated and propagated, yielding large amounts of energy in the form of highly energetic neutrons.

One target design requires a hollow sphere or shell, in which the wall is a low density, porous material which can serve as a reservoir for the liquid fuel. Darling, D. H., U.S. Pat. No. 4,693,938. Further, the wall material of the hollow sphere should be sufficiently strong to support the fuel-loaded sphere during acceleration and injection of the hollow sphere into the ICF reactor.

Hollow spheres of porous inorganic materials appear to be especially suitable for formation of ICF target shells. The use of inorganic materials, such as silica, enables formation of porous, yet strong microspheres of the appropriate physical dimensions.

Several approaches have been taken to form aerogels into desired shapes. Prior work to make formed elements has produced droplets of spheroidal shape, but not hollow spheres of controlled size.

U.S. Pat. No. 2,463,467 by M. M. Marisic disclosed a method for producing strong inorganic oxide aerogel pellets by spray drying through an orifice to form aerogel globules which are of large size, one-half inch in diameter. The colloidal solution was ejected into a water-immisible fluid or air.

U.S. Pat. No. 3,245,918 by A. J. Burzynski disclosed production of solid silica beads from alkyl orthosilicates. The bead size ranged from 1 micron to 1.5 mm in diameter.

U.S Pat. No. 3,161,468 by R. J. Walsh disclosed the formation of hollow spherical shells of small size by a flame combustion process. The silica sol was atomized into a flame of 600° to 1800° C. to produce hollow spherical shells of silica which were 0.2 to 20 microns in diameter, but there was no specific regulation of the diameter. The shell composition was not porous silica aerogel.

U.S. Pat. No. 2,834,739 by Reeves et al. disclosed production of inorganic oxide gels from furnace slags. Microspheroidal gel particles of low density were made by spraying silica-alumina hydrosol droplets through an atmosphere of air and ammonia in order to increase the pH to an optimum for formation of a gel. The method described formation of synthetic oxide gels with densities of 0.9 to 1.0 whereas aerogels have densities in the range of about 0.020 to 0.3 g/cm$^3$.

Hollow glass microspheres have been made by the vertical-drop furnace liquid-drop process in which solvent evaporates as the liquid is dropped through various temperature gradients, as was described by A. Rosencwaig et al. in U.S. Pat. No. 4,257,799. Similar production techniques have been used on hollow polystyrene spheres Both glass and polystyrene microspheres can fall to the bottom of the drop-tower and are sturdy enough to be recovered without damage.

The methods previously described are inadequate for making hollow aerogel microspheres which have the desirable properties of strength, but porous aerogel walls.

SUMMARY OF THE INVENTION

Accordingly, it is an object of this invention to provide a hollow aerogel microsphere of selected dimensions and wall thickness.

It is also a object of the present invention to provide a method for making the above-described hollow aerogel microsphere.

It is a further object of the invention to describe an apparatus for making of hollow aerogel microspheres.

The invention discloses a hollow aerogel microsphere of such strength and wall porosity that it can serve to hold materials emplaced in the wall of the sphere. The hollow aerogel microspheres, especially silica aerogel microspheres, are of uniform wall thickness, density, refractive index and strength. Such a hollow aerogel microsphere could serve as a target capsule for deuterium-tritium fuel of an ICF reactor.

The invention further discloses a method for making hollow aerogel microspheres by using a specially designed nozzle to blow microshells of a partially gelled solution of metal alkoxides, alcohol, water, and a catalyst into an atmosphere comprising the catalyst. The partially gelled hydrolysis-condensation product is termed an alcogel, and following removal of the solvent, it is termed an aerogel. The hollow alcogel microspheres formed are collected on a bed of foam containing base catalyst, and further subjected to supercritical extraction of the alcohol solvent, followed by drying under supercritical conditions. Hollow silica aerogel microspheres, in particular, can be formed by this method. The fragile formed silica alcogel microspheres are collected on ammoniated foam. The alcogel microspheres are subsequently dried under supercritical conditions similar to those described by S. Henning and L. Svensson in Phys. Scripta 23, 698 (1982).

The invention further discloses an apparatus for the formation of hollow aerogel microspheres which comprises a dual concentric nozzle which directs a gas stream of nitrogen and ammonia gas through an inner concentric nozzle into a forming drop of the viscous phase of the metal alkoxide gelling solution. This occurs when the metal alkoxide reacts with water in a solution of water, alcohol and base catalyst. The gas stream from the inner concentric nozzle forms a gas bubble within the already gelling solution extruded by the outer concentric nozzle. The gas stream also can regulate the size and shape of the formed droplet. The hollow sphere of the gelling solution falls a selected distance through an atmosphere of the base catalyst and is collected on a soap foam which contains more base catalyst.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
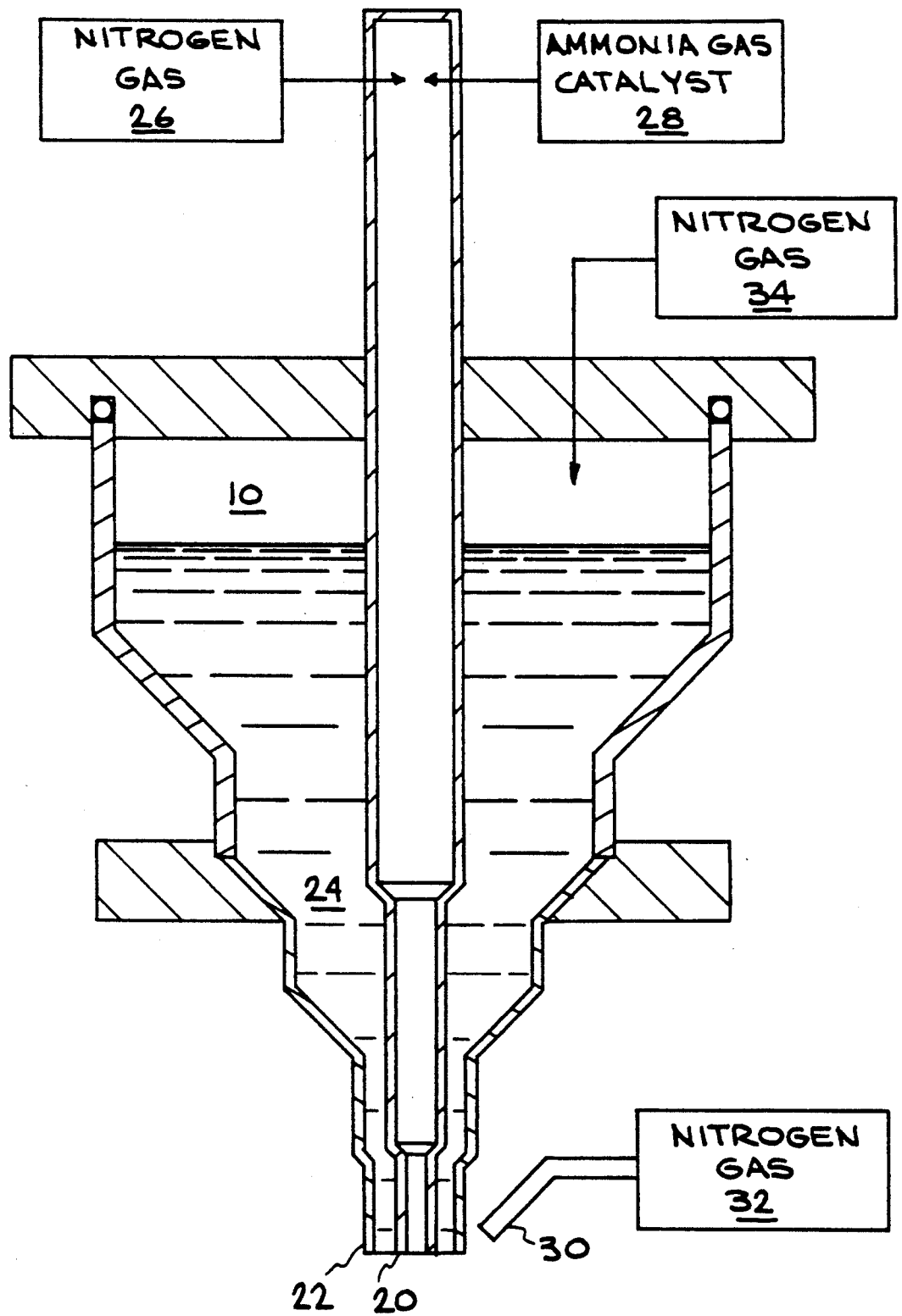
FIG. 1 is a schematic of the hollow microsphere generation nozzle assembly.

The subject invention is a strong, porous, hollow metal oxide aerogel microsphere which can be made only by use of the specific reagents and processing steps described herein. The method described enables the formation of hollow metal oxide aerogel microspheres by continued reaction of the reagents to form an alcogel during the microsphere formation process. The apparatus is designed to enable formation of hollow microspheres while the sol-gel transformation reaction occurs. The alcogel microspheres are collected on a foam surface which contains additional catalyst, the reactant water is replaced with solvent and the solvent is removed by a supercritical process.

The formation of conventional aerogels, of a density of about 0.03 g/cm³ to 0.3 g/cm³ has been described in earlier references of Teichner et al. U.S. Pat. No. 3,672,833 and von Dardel et al., U.S. Pat. No. 4,402,927. In this conventional aerogel formation process, the single step sol-gel process involves the hydrolysis reaction of metal alkoxide compounds with water in either an acid, neutral or basic medium, followed by the condensation reactions, in which the hydrolysis products polymerize to form an alcogel gel. Alcohol is added as a solvent during the reaction and is removed by raising the wet alcogel to high temperatures and pressures required for supercritical extraction of the solvent. The product formed after removal of the solvent from the alcogel is an aerogel.

The alcoholic solvent may be replaced by exchange with another alcoholic solvent or $CO_2$ prior to supercritical extraction.

The method is applicable to formation of metal oxide aerogels from a variety of metal alkoxides, including but not limited to, germanium, tantalum, zirconium, boron, titanium, aluminum and silicon. In the preferred mode, silica aerogel is formed from silica alkoxide.

In a commercial process for making silica aerogels, such as that described by S. Henning and L. Svensson (Phys. Scripta 23: 698 (1982) and U.S. Pat. No. 4,402,927 by von Dardel et al.), an orthosilicate, such as tetramethoxysilane (TMOS), was reacted with water in the presence of basic catalyst ($NH_4OH$) according to the overall reaction:

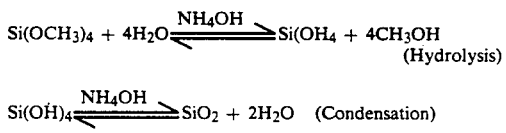
(Hydrolysis)

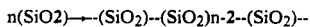 (Condensation)

In the generic reaction, the methyl groups of the orthosilicate may be replaced by any alkyl group, including ethyl, propyl or butyl group. The overall reaction for the silicic acid is:

$$Si(OH)_4 \rightarrow SiO_2 + 2H_2O$$

which is followed by gelation:

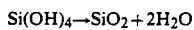

The hydrolysis and condensation reactions can occur nearly simultaneously in the reaction vessel. The time for the condensation formation of the gel can be seconds to several weeks. The actual reaction mechanism is dependent on several variables, including the type of alkyl group, the nature and concentration of the catalyst and the pH of the reaction mixture.

Catalysts of the hydrolysis reaction may be either acids or bases. Henning et al. (1982) demonstrated ammonia to be a desirable catalyst for TMOS hydrolysis, whereas Schmitt (1982, M. S. Thesis, U. Wisconsin) found nitric acid to be an acceptable catalyst for TEOS (tetraethoxysilane) hydrolysis. Either base or acid will catalyze the gelation reaction. These previous descriptions of aerogel production, however, provided only methods for making cast blocks or sheets and pellets or granules.

Hollow aerogel microspheres of the instant invention are produced by generating the droplet at the time of optimum viscosity change rate of the gelling metal alkoxides, injecting inert gas and catalyst into the droplet and releasing the newly formed hollow microsphere into a drop-tower atmosphere which comprises additional catalyst. The concentric nozzle for droplet formation is constructed to form a droplet which contains an internal reservoir of catalyst as the droplet is released into the atmosphere which also comprises catalyst to continue gellation reaction on the external surface. The reaction chamber height is selected so as to optimize the length of time that the hollow microsphere is in free fall, which provides optimal hydrolysis for making a shell stronger, which is better able to withstand the impact of collection, and yet attribute to the hollow microsphere the lowest velocity at impact. The collection surface is covered with a layer of foam, comprising catalyst, to limit the incident forces upon the hollow microsphere at impact. The method is suitable for making hollow aerogel microspheres from any of several metal alkoxides including, but not limited to silicon alkoxide.

The metal alkoxide used to make hollow aerogel microspheres may be of any of several metal alkoxides, including but not limited to germanium, tantalum, zirconium, boron, titanium, aluminum and silicon. Silicon alkoxides are preferred. Silicon alkoxides, such as tetramethoxysilane, tetraethoxysilane, tetrapropoxysilane and tetrabutoxysilane, may be used, with tetramethoxysilane and tetrabutoxysilane preferred, in particular. The catalyst may be acid or base, with base catalysts preferred including, but not limited to $NH_4OH$, NaOH, KOH and gaseous ammonia. Gaseous ammonia is preferred, in particular.

The hollow alcogel microsphere generation apparatus of the instant invention comprises three major components, including a nozzle assembly, a reaction chamber and a collection unit.

The nozzle assembly for forming the hollow aerogel microspheres (FIG. 1) is comprised of two concentric nozzles, an inner nozzle (20) and an outer nozzle (22), which are regulated by flow controllers. The outer nozzle (22) provides regulated release of the viscous gelling solution, which contains reacting metal alkoxides, alcohol solvent, water and ammonia catalyst. The reactants of the gelling solution are mixed and added to the feed tank (10). The reactants flow into the gelling solution reservoir (24) which is pressurized by a nitrogen stream (34). The gelling solution forms an alcogel droplet during free fall from the concentric nozzles (20)(22). The inner concentric nozzle (20) regulates the flow of a mixture of nitrogen carrier gas from a nitrogen supply (26) and catalyst. In the preferred mode, the catalyst is ammonia gas catalyst released from the ammonia gas supply (28). The inner concentric nozzle (20) facilitates the creation of a gas bubble which is trapped by the gelling solution alcogel droplet in the annulus between the inner (20) and outer (22) concentric nozzles. The presence of ammonia catalyst in the forming gas bubble serves to accelerate the gelling process in the falling droplet. The presence of ammonia catalyst also helps to form the inner skin which stabilizes the inner bubble.

Movement of the position of the inner concentric nozzle (20) in relation to the outer concentric nozzel (22) controls the cross section of the flow of the gelling metal alkoxide. Modification of the position of the flow tips of the inner and outer concentric nozzle orifices can be used to adjust and control the liquid and gas flows.

A jet of nitrogen gas from a transverse jet (30) of a $N_2$ supply (32) is used to deflect the droplets from the tip of the concentric nozzles (20)(22). This deflection of the droplet helps to avoid the formation of a tail. The deflection also imparts a tumbling and vibrating motion to the droplet which helps to center the inner bubble and reduces the possibility that the droplets will collide with each other. The position of the transverse jet (30) is adjustable in both the horizontal and vertical directions and consistent settings can be used to form standardized droplets on repeated runs.

Figure 2:
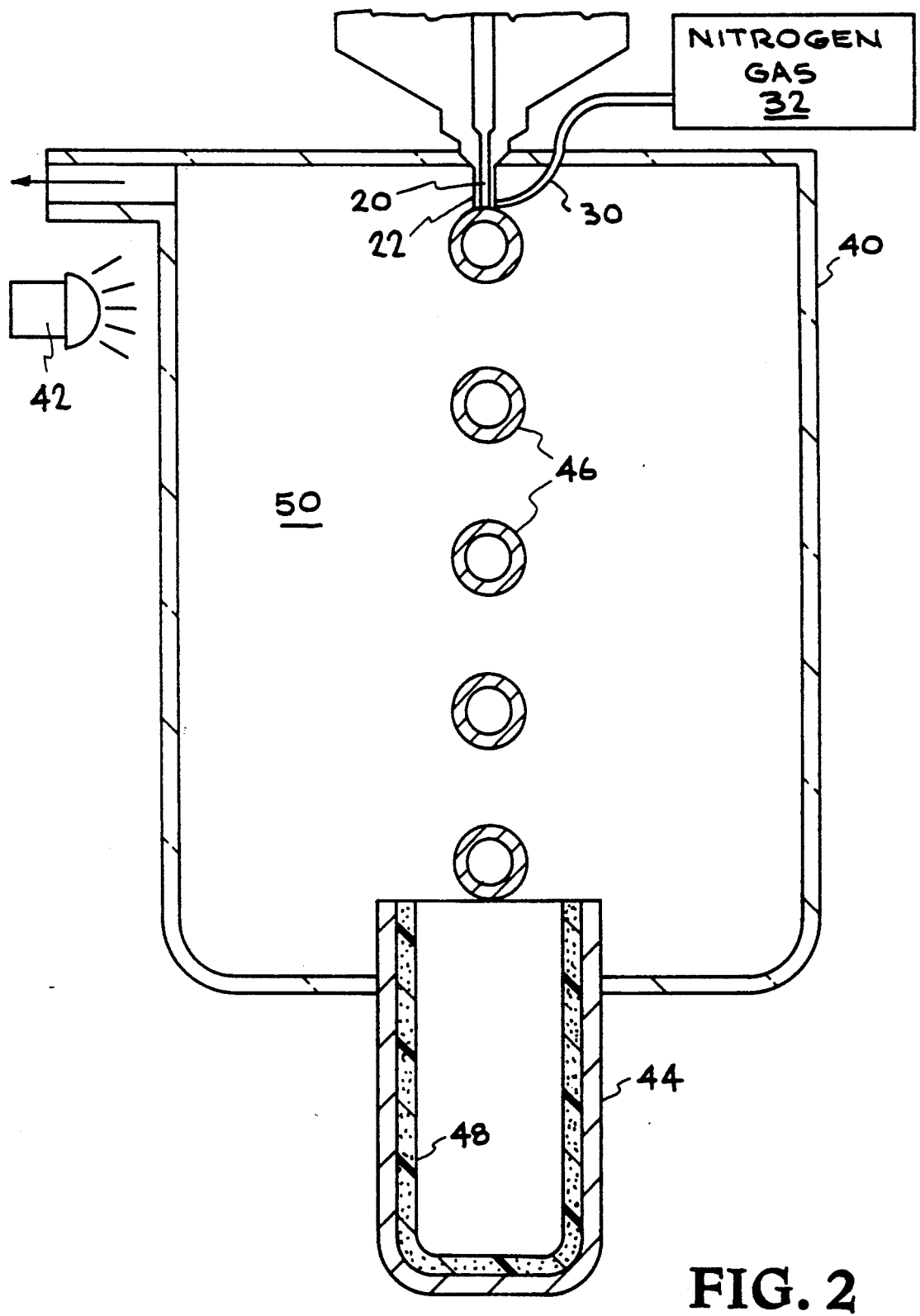
FIG. 2 is a schematic of the microsphere reaction chamber and collection unit.

A representative drop-tower (FIG. 2) comprises a reaction chamber (40) which is a plexiglass box of about one meter in height with a cross-section of about 40 cm by 30 cm. A strobe light (42) is positioned in front of the concentric nozzles (20)(22) during hollow alcogel microsphere (46) formation to assist in the quantitation of the flow rates of the liquids and gases. Measurement of these flow rates assist in the positioning of the concentric nozzles (20)(22) and the transverse jet (30) to cause formation of a hollow microsphere of selected size. The atmosphere (50) in the reaction chamber contains catalyst, in the preferred mode a concentration of ammonia gas, ranging from 0% to 15% in $N_2$. This atmosphere serves as a catalyst of the continuing hydrolysis and condensation reactions as the hollow alcogel microsphere falls the height of the reaction chamber. The ammonia catalyst also stabilizes the shape of the falling hollow alcogel microsphere by forming an external skin on the droplet. The concentration of ammonia is chosen such that an explosive mixture is not formed when mixed with air.

The hollow alcogel microsphere collection unit is a collecting pan (44) which contains a layer of foam made from soap solution that contains a small amount of catalyst, in the preferred mode, ammonia. The foam is made from a 50–50 alcohol-water solution which contains less than 1% base catalyst and 0.5–1% of commerical soap or detergent. The soft, hollow alcogel microspheres break or deform if not collected over a foam. Previous collection attempts without foam resulted in damage to the hollow microspheres when they were collected over liquids such as ethanol, methanol or ammoniated water. The foam acts by slowing down the falling hollow microsphere and reducing the forces at impact.

Collected alcogel hollow microspheres are removed from the alcohol solvent and water mixture and supercritically dried. Water and soap are removed by subjecting the hollow alcogel microspheres to a series of alcohol washes, with a final concentration of 100% alcohol. The alcohol solvent is removed from the collected hollow alcogel microspheres by exposing them to corresponding supercritical conditions of temperature and pressure to produce hollow aerogel microspheres. When at supercritical conditions of pressure, (over 78.5 atm for methanol), and temperature, (over 240° C. for methanol), the solvent is converted to a "fluid state", and is gradually removed from the matrix. If preferred, another alcohol solvent may be substituted for methanol, prior to supercritical extraction.

Drying the hollow alcogel microspheres at ambient conditions of temperature and pressure is ineffective for preservation of the structure because the surface tension of the solvents (water and alcohol) in the alcogel matrix damage the pores progressively as the vapor-liquid interface recedes from the surface. Ambient drying conditions cause collapse and consolidation of the aerogel structure. Such drying conditions yield a "xerogel" which has a much higher density and refractive index than aerogels.

The hollow aerogel microspheres produced by the disclosed method are in size range of 800–1200 $\mu m$ diameter, with a wall thickness of 100–300 $\mu m$.

The advantages of the process of this invention and the hollow aerogel microspheres produced thereby can be seen in the following examples which are intended to be illustrative of the invention, but are not limiting thereof.

EXAMPLES

1. Aerogel Reaction Mixture

In a preferred method, a gelling solution for producing silica aerogel was made by mixing 63 ml of distilled water, 147 ml of ethanol(95%, by weight), 56 microliters of ammonia solution in water (35%, by weight), and 63 ml of TMOS (tetramethoxysilane). TMOS was obtained under the trade name of Dynasil M, from Kemi-Intressen AB of Sweden, and has a viscosity of 5 cp at 20° C. The solution was stirred slowly at room temperature and the changing viscosity of the condensing alcogel continuously monitored by a viscometer, such as model NDJ-1 Rotating Viscometer from Pfleuger AB of Sweden. When the viscosity of the gelling solution reached about 25 cp, the solution was transferred to the feed tank (10) at the top of the hollow alcogel microsphere generator.

2. Alcogel Microsphere Generator

The concentric nozzle used in the hollow alcogel microsphere generator was designed and constructed so that a hollow shell of alcogel was formed by penetrating a forming droplet with a stream of inert gas and catalyst, preferably $N_2$ carrier gas and ammonia catalyst.

The gelling solution was mixed as described previously and placed in the feed tank (10) of the microsphere generator. The gelling solution flowed into the gelling solution reservoir (24). A flow regulator was used to adjust the pressure which the pressurizing nitrogen stream (34) exerts on the gelling solution reservoir (24) to start the flow of the viscous gelling solution. A second flow regulator was used to adjust the stream of nitrogen gas from the $N_2$ supply (26) which was mixed with gaseous ammonia from the ammonia supply (28) and directed to the inner concentric nozzle (20). Nitrogen flow from a nitrogen supply (32) was initiated at the transverse jet (30), as the droplets began to fall. The strobe light (42) was used to observe and calibrate the rate of $N_2$ flow from the transverse jet (30) and the rate of falling droplets as they are formed into hollow alcogel microspheres.

The quality of the drops may be adjusted by altering the position of the inner and outer concentric nozzles (20, 22) and the transverse jet (30). Larger droplets with thicker walls may be obtained by raising the height of the inner nozzle (20) to increase the cross sectional area available for the flowing gelling solution. When the vertical and horizontal distance of the transverse jet (30) tip is changed with respect to the center of the outer concentric nozzle (22) tip, the time of formation of the droplet shell and the length of the trajectory can be altered. When there is a longer path length and increased time of flight, there is increased time for gellation of the hollow alcogel microspheres (46). The small eddy currents in the reaction chamber (40) cause the hollow alcogel microspheres to spread out horizontally and reduce their chance of in-flight collision. If the transverse jet (30) gas flow is adjusted to too high a rate, the microshells are blown away by excessive turbulence near the outlet of the concentric nozzles (20)(22). When the flow of nitrogen gas through the transverse jet (30) is too low, the viscous drag on the droplet is reduced which results in connected droplets.

Adjustment of the flow rate of the nitrogen gas from the $N_2$ supply (26) to the inner concentric nozzle (20) can be used to regulate the thickness of the hollow microsphere shell wall. An increased nitrogen gas flow rate from the inner concentric nozzle (20) produced thinner shell walls of the hollow microsphere, however, if they were too thin, the shells would break. When the $N_2$ flow rate was reduced, the walls of the shells were thicker. Ultimately solid spheres are produced, when the flow rate of $N_2$ and $NH_3$ to the inner concentric nozzle (20) was reduced to zero.

Selection of the appropriate flow controller settings was empirical and subjective. Repeated adjustments were necessary Ideally, the droplets should be small, round and without tails. They should be clearly separated and not connected. The droplets should be evenly spaced so that there is little chance of in-flight collision. When the quality of the observed droplets was as selected, a controller switch was opened to admit ammonia from the ammonia supply (28) to flow into the inner concentric nozzle (20). Ammonia was not introduced in the flow of the transverse jet (30). It was important to avoid contact with added ammonia until the droplets had cleanly separated from the concentric nozzles (20)(22) and formed their hollow spherical shape. Earlier addition of the ammonia would result in clogging of the nozzle tips.

3. Alcogel Microsphere Collection Foam

The formed hollow alcogel microspheres were collected on foam on the collecting pan (44). The foam layer (48), which was placed on the pan (44), was prepared by mixing at room temperature, equal parts by volume of an alcohol (such as methanol) and water to make up a 6500 ml of solution, with 150 ml of a 35%, by weight, of ammonia solution. To this solution was added 0.5 to 1.0% by weight of a commercial soap or detergent, such as Palmolive or Tide detergent. Compressed air was blown through a brass tube, containing small bored holes, into a portion of this solution in a large beaker. The foam was generated until it reached a height of about 10 cm in the beaker.

The beaker of foam was emptied into the collecting pan (44) under the droplet generator. Following generation and collection of the hollow alcogel microspheres, the foam layer (48) was dispersed by covering the foam with an alcohol, such as methanol. When the foam was dispersed, the alcogel spheres were removed from the collecting pan (44) and placed in a flask with methanol. The microspheres could be moved with a short pipette that has a polished rounded end, to minimize damage to the spheres. It was advantageous to minimize the amount of time that the alcogel spheres were in contact with the aqueous soap solution. Residual water and soap were removed from the alcogel spheres by passing them through three changes of methanol, of progressively increased alcohol concentration. In the preferred mode, three alcohol changes, which were approximately 50%, 80% and 100% by volume, which were spaced approximately 48 hours apart, were used.

4. Supercritical Drying of the Hollow Alcogel Microspheres

After methanol has replaced any water and soap in the hollow alcogel microspheres, the microspheres were cured to the aerogel by supercritical removal of the methanol solvent. The microspheres were placed in an autoclave which was raised to supercritical conditions, with pressure of over 78.5 atm, temperature over 240° C., held there for a few hours, and gradually reduced to ambient conditions. The small, light spheres required extra care to immobilize them during this process. A small container of wire gauze was suitable for this purpose.

5. Characterization of the Hollow Aerogel Microspheres

Figure 3:
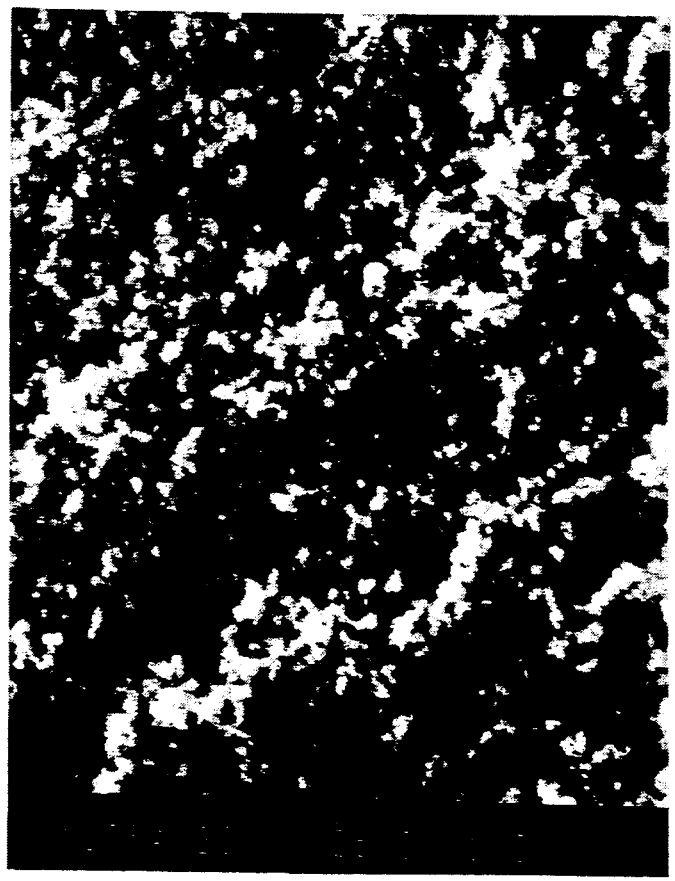
FIG. 3 is a SEM view of hollow aerogel spheres made by the droplet process.

The hollow aerogel microspheres were examined by optical means for assessment of size, sphericity and surface quality. Interferometry was used to measure the refractive index of the aerogel and the uniformity of the wall thickness of the hollow microspheres. Typical microspheres had a sphere size of 800–1200 $\mu$ and wall thickness of 100–300 $\mu$. Scanning electron microscopy was used to examine the structure of the material of the walls of the hollow aerogel microspheres. Hollow aerogel microspheres made by the described process are shown in FIG. 3.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A process for preparing hollow aerogel microspheres, comprising the steps of:
    reacting metal alkoxide with water and base catalyst in alcohol solvent until a viscous alcogel is attained;
    forming a drop of viscous alcogel;
    injecting inert gas and base catalyst into the drop, at the time of drop formation, to form a hollow alcogel microsphere;
    blowing the hollow alcogel microsphere free of the viscous alcogel to fall into an atmosphere of inert gas and base catalyst;
    capturing said hollow alcogel microsphere on foam; and
    subjecting said hollow alcogel microsphere to supercritical drying to form a hollow aerogel microsphere of 800–1200 $\mu$m diameter with a wall thickness of 100–300 $\mu$m and a wall density of 0.03 to 0.3 g/cm$^3$.

2. The process of claim 1 wherein said metal alkoxide is silicon alkoxide compound.

3. The process as in claim 2 wherein said silicon alkoxide compound is selected from the group consisting of tetramethoxysilane, tetraethoxysilane, tetrapropoxysilane and tetrabutoxysilane.

4. The process of claim 1 wherein said base catalyst is selected from the group consisting of NH$_4$OH, NaOH, KOH and gaseous ammonia.

5. The process as in claim 4 wherein said base catalyst is gaseous ammonia.

6. The process of claim 1 wherein said foam is comprised of soap and base catalyst.

7. The process of claim 1 wherein said alcogel is prepared by mixing metal alkoxide with water in about a 1:4 molar ratio in the presence of base catalyst.

8. The process of claim 1 wherein said supercritical drying comprises replacing entrapped water in the hollow alcogel microsphere with an organic solvent, and heating the hollow alcogel microsphere under conditions of supercritical pressure and temperature.

9. A hollow aerogel microsphere prepared by the process comprising:
    reacting metal alkoxide with water and base catalyst in alcohol solvent until a viscous alcogel is attained;
    forming a drop of viscous alcogel;
    injecting inert gas and base catalyst into the drop, at the time of drop formation, to form a hollow alcogel microsphere;
    blowing the hollow alcogel microsphere free of the viscous alcogel to fall into an atmosphere of inert gas and base catalyst;
    capturing said hollow alcogel microsphere on foam; and
    subjecting said hollow alcogel microsphere to supercritical drying to form a hollow aerogel microsphere of 800–1200 $\mu$ diameter with a wall thickness of 100–300 $\mu$ and a wall density of 0.03 g/cm$^3$ to 0.3 g/cm$^3$.

10. The hollow aerogel microsphere as in claim 9 wherein said metal alkoxide is silicon alkoxide compound.

11. The hollow aerogel microsphere as in claim 10 wherein said silicon alkoxide compound is selected from the group consisting of tetramethoxysilane, tetraethoxysilane, tetrapropoxysilane and tetrabutoxysilane.

12. The hollow aerogel microsphere as in claim 9 wherein said base catalyst is selected from the group consisting of NH$_4$OH, NaOH, KOH and gaseous ammonia.

13. The hollow aerogel microsphere as in claim 12 wherein said base catalyst is gaseous ammonia.

14. The hollow aerogel spher as in claim 9 wherein said foam is comprised of soap and base catalyst.

15. A hollow aerogel microsphere formed from a metal alkoxide having a diameter of 800–1200 $\mu$ and a wall thickness of 100–300 $\mu$ and a wall density of 0.03 g/cm$^3$ to 0.3 g/cm$^3$.

16. A hollow aerogel microsphere of claim 15 prepared by:
    reacting metal alkoxide with water and base catalyst in alcohol solvent until a viscous alcogel is attained;
    forming a drop of viscous alcogel;
    injecting inert gas and base catalyst into the drop, at the time of drop formation, to form a hollow alcogel microsphere;
    blowing the hollow alcogel microsphere free of the viscous alcogel to fall into an atmosphere of inert gas and base catalyst;
    capturing said hollow alcogel microsphere on foam; and
    subjecting said hollow alcogel microsphere to supercritical drying to form a hollow aerogel microsphere, of 800–1200 $\mu$ in diameter.

* * * * *